United States Patent
Ruemmler et al.

(10) Patent No.: US 7,100,014 B2
(45) Date of Patent: Aug. 29, 2006

(54) MEMORY STACK ARCHITECTURE FOR REDUCED TLB MISSES

(75) Inventors: Christopher Philip Ruemmler, Morgan Hill, CA (US); Fani A. Pavlova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 10/662,734

(22) Filed: Sep. 15, 2003

(65) Prior Publication Data

US 2005/0060511 A1    Mar. 17, 2005

(51) Int. Cl.
*G06F 12/00* (2006.01)
*G06F 12/14* (2006.01)

(52) U.S. Cl. .............. 711/170; 711/173; 711/152; 711/163; 707/205

(58) Field of Classification Search .............. None
See application file for complete search history.

(56) References Cited

U.S. PATENT DOCUMENTS

| | | | |
|---|---|---|---|
| 5,920,895 A * | 7/1999 | Perazzoli et al. ........... 711/163 |
| 5,940,872 A | 8/1999 | Hammond et al. | |
| 5,950,221 A * | 9/1999 | Draves et al. .............. 711/100 |
| 6,253,320 B1 * | 6/2001 | Sekiguchi et al. ............ 713/2 |
| 6,314,513 B1 | 11/2001 | Ross et al. | |
| 6,349,355 B1 * | 2/2002 | Draves et al. ................. 711/6 |
| 6,665,793 B1 * | 12/2003 | Zahir et al. ................. 712/228 |
| 6,895,508 B1 * | 5/2005 | Swanberg et al. ........... 726/16 |

\* cited by examiner

*Primary Examiner*—Gary Portka
*Assistant Examiner*—Jasmine Song

(57) ABSTRACT

One embodiment disclosed relates to a computer system. The computer system includes a microprocessor, an operating system, and a memory system. The microprocessor includes a register stack and a register stack engine (RSE), and the operating system includes a kernel. The memory system is configured to have a single memory page that includes both a kernel stack and an RSE stack. The memory system may be further configured such that the kernel stack and the RSE stack grow in opposite directions and such that a uarea data structure is located between those two stacks.

15 Claims, 4 Drawing Sheets

MEMORY STACK ARCHITECTURE FOR REDUCED TLB MISSES

BACKGROUND OF THE INVENTION

1. Field of the Invention

The present invention relates generally to microprocessors and operating systems.

2. Description of the Background Art

It is common for a computer processor and associated operating system (OS) to have two different levels of resources and protection. One level is referred to as a non-privileged mode or user mode. This mode is typically used by various operating system components, application programs, and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions. While a user process may itself crash, it should not be able to crash other programs or the operating system.

The other level of execution is referred to as privileged mode, system mode, or kernel mode. Critical operating system components are implemented in kernel mode. Kernel-mode components are responsible for things like virtual memory management, responding to interrupts and exceptions, scheduling execution threads, synchronizing the activities of multiple processors, and other critical or sensitive functions. Such components, which execute from system mode, are sometimes generally referred to collectively as "the kernel."

The kernel is responsible for supervising the virtual memory system in most computer systems. The virtual memory system is largely responsible for isolating processes from each other. With virtual memory, a process is assigned its own virtual address space, which is not available to other processes. Through its virtual memory, a process has a logical view of memory that does not correspond to the actual layout of physical memory. Each time a process uses a virtual memory address, the virtual memory system translates it into a physical address using a virtual-to-physical address mapping contained in some type of look-up structure and address mapping database.

FIG. 1 shows certain components of a conventional computer system. The illustrated components of the computer system 40 include a microprocessor 41 and a computer-readable storage medium such as memory 42. Although FIG. 1 shows only a single processor, the system might include multiple processors. The multiple processors may be used by multiple different processes or tasks, each having one or more execution threads. The terms task and process as used in this description refer to executing entities within a computer system having their own virtual address spaces. A thread is characterized as having its own context (including registers and memory stack) and as being independently subject to the kernel's scheduling algorithms. The computer system 40, of course, also includes other components that are not shown.

In accordance with conventional computer systems, the computer system 40 includes an operating system and one or more application or user programs that execute in conjunction with the operating system. FIG. 1 shows a portion 43 of the operating system referred to as the kernel, and a single application or user process 44. Although only one user process is shown, a plurality of user processes typically execute from memory 42. As described above, the processor 41 may operate using privileged and non-privileged execution modes. User processes and threads typically run in the non-privileged execution mode, and make calls to system or kernel functions that execute in the privileged execution mode. Additional kernel functions and threads also run in the privileged execution mode to deal with memory faults and other interrupt-based events in accordance with conventional operating system characteristics.

Memory in a computer typically comprises a linear array of bytes. Each byte has a unique address known as its physical address. However, many microprocessors do not typically address memory by the memory's physical address. Instead, memory is addressed using virtual memory addresses. A virtual memory address, which is commonly known as a virtual address, is an address of a location in virtual memory.

Virtual memory addressing is a technique used to provide the illusion of having a memory space that is much larger than the physical memory available in a computer system. This illusion allows a computer program to be written without regard to the exact size of physical memory. One benefit of virtual memory addressing is that a computer program can easily run on a computer with a wide range of memory configurations and with radically different physical memory sizes. Another benefit is that a computer program may be written that uses a virtual memory size that is much larger than the physical memory available on a particular computer system.

Virtual memory may be thought of as a collection of blocks. These blocks are often of fixed size and aligned, in which case they are known as pages. A virtual address may often be broken down into two parts, a virtual page number and an offset. The virtual page number specifies the virtual page to be accessed. The offset indicates the number of memory bytes from the first memory byte in the virtual page to the addressed memory byte. Physical addresses, which represent where data actually resides in physical memory, may also be broken down into two parts, a physical page number and an offset. The physical page number specifies the physical page to be accessed. The offset indicates the number of memory bytes from the first memory byte in the physical page to the addressed memory byte.

A virtual address must be mapped into a physical address before physical memory may be accessed. The mapping is often maintained through a table, known as a page table. The page table contains virtual to physical memory translations. A virtual to physical memory translation consists of a virtual page number and a corresponding physical page number. Because virtual addresses are typically mapped to physical addresses at the level of pages, the page table may be indexed by virtual page numbers. In addition to virtual to physical memory translations, the page table may often contain other information such as the disk locations where pages are stored when not present in main memory and an indication of whether pages are present in memory or residing on a disk. Typically, the operating system inserts and deletes the virtual to physical memory translations that are stored in the page table. In other words, the page table is managed by the operating system.

Virtual memory requires two memory accesses to fetch a single entry from memory. The first access is into the page table. This access is used to map the virtual address into the physical address. After the physical address is known, then a second access is required to fetch the data. In an effort to speed up memory accesses, conventional microprocessors use a special-purpose cache memory to store certain virtual to physical memory-translations. This special-purpose cache memory is often called a translation lookaside buffer (TLB). The number of virtual to physical memory translations in a TLB is typically smaller than the total number of translations in the page table.

When a microprocessor addresses memory through a TLB, the virtual page number that is included in the virtual address is used to interrogate the TLB. If the virtual page number is stored in the TLB, then the TLB outputs the physical page number that maps to the virtual page number. Sometimes the TLB does not contain the virtual page number. This is known as a TLB miss. When a TLB miss occurs, the microprocessor typically requests the operating system to supply the physical page number from the page table. After the operating system supplies the physical page number, the physical memory is addressed. When the operating system supplies the physical page number, an undesirable delay occurs.

A memory stack is a region of reserved memory in which programs store status data such as procedure and function call return addresses, passed parameters, and local variables. The microprocessor, the program, and the operating system can all maintain one or more separate memory stacks.

Logically, a stack may comprise a memory structure organized, for example, as a LIFO (last in, first out) list such that the last data item added to the structure is the first item used. A program can put data onto the stack by executing microprocessor instructions. For example, a "push" instruction typically writes a specified microprocessor register to the stack. A "pop" instruction reads data from the stack. The microprocessor often writes to and reads from the stack automatically in response to certain program flow instructions and other events such as memory faults or interrupts.

As shown in FIG. 2, a memory stack (whether a user memory stack or a kernel memory stack) is typically implemented as a region of virtual memory beginning at a stack base or stack base address. FIG. 2 shows a portion of virtual memory from top to bottom in order of increasing virtual memory addresses. The memory stack is indexed by a pointer referred to as the "stack pointer." When writing to the stack, the microprocessor decrements the stack pointer to the next available address, and then writes the specified data to that address. When reading from the stack, the microprocessor reads from the virtual memory location currently referenced by the stack pointer, and then increments the stack pointer.

A register stack may comprise a number of general registers of a microprocessor, which have been designated for the storage of data required by, and pertaining to, procedures of a stored program being executed by the microprocessor. Specifically, upon execution of a particular procedure, a stack frame associated with that procedure is created within the register stack. The stack frame includes saved registers (containing variables local to relevant procedure), an activation record and a frame marker. When a procedure calls a further procedure, the called procedure in turn creates a further stacked frame on top of the stacked frame for the calling procedure. Accordingly, for a program in which a number of nested procedures are being executed, the register stack may include a corresponding number of stack frames.

A register stack accordingly allows multiple procedures to effectively share a large register file by stacking associated stack frames in both on-chip registers and off-chip memory. The call/return patterns of typical programs exhibit high call/return frequencies with small amplitudes. A register stack significantly reduces the number of stores (i.e., register saves) at procedures calls, and reduces the number of loads (i.e., register restores) at procedure returns.

In accordance with some microprocessors, a register stack engine (RSE) may be used to manage the register stack, saving and restoring the physical registers to and from memory as needed. The memory allocated for the dynamic reading and writing of the registers by the RSE is sometimes called the backing store.

SUMMARY

One embodiment of the invention relates to a computer system. The computer system includes a microprocessor, an operating system, and a memory system. The microprocessor includes a register stack and a register stack engine (RSE), and the operating system includes a kernel. The memory system is configured to have a single memory page that includes both a kernel stack and an RSE stack. The memory system may be further configured such that the kernel stack and the RSE stack grow in opposite directions and such that a uarea data structure is located between those two stacks.

Another embodiment of the invention relates to a method of a process entering a kernel of an operating system configured for an IPF processor architecture. A kernel stack within a memory page is accessed. In addition, an RSE stack within the same memory page is accessed. Further, a uarea data structure within the same memory page is accessed.

DETAILED DESCRIPTION

Multiple memory stacks are usually implemented in a computer. For example, each user process might have one or more memory stacks. When a new user stack is set up, a range of virtual addresses is typically reserved for use with the new stack. However, only a small amount of physical memory is typically reserved, allocating additional memory on an as-needed basis.

Similarly, the kernel typically uses several memory stacks. It is highly desirable, in fact, for the kernel to use different stacks than user processes to prevent user processes from interfering with kernel processes. While it would be desirable for the kernel memory stacks to be dynamically re-sizable, such a feature has been difficult to implement.

As described below, one embodiment of the present invention pertains to improving the memory stack architecture for the kernel of an operating system running on an IPF type processor. The recently introduced Itanium microprocessor, manufactured by Intel Corporation of Santa Clara, Calif., is a CPU under the Intel IPF processor architecture. In accordance with an embodiment of the invention, the improved stack architecture provides for higher performance by reducing the number of TLB misses that typically occur as a new process enters the kernel. In addition, the improved memory stack architecture facilitates implementation of dynamic growth of the "regular" kernel stack and the RSE stack over time.

Figure 1:
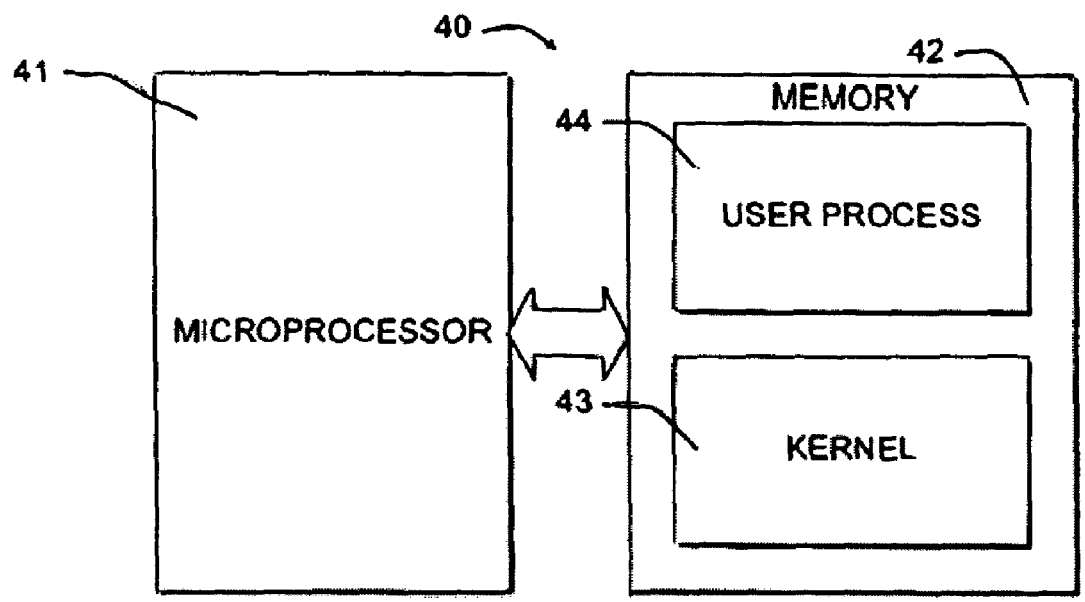
FIG. 1 shows certain components of a conventional computer system.
Figure 2:
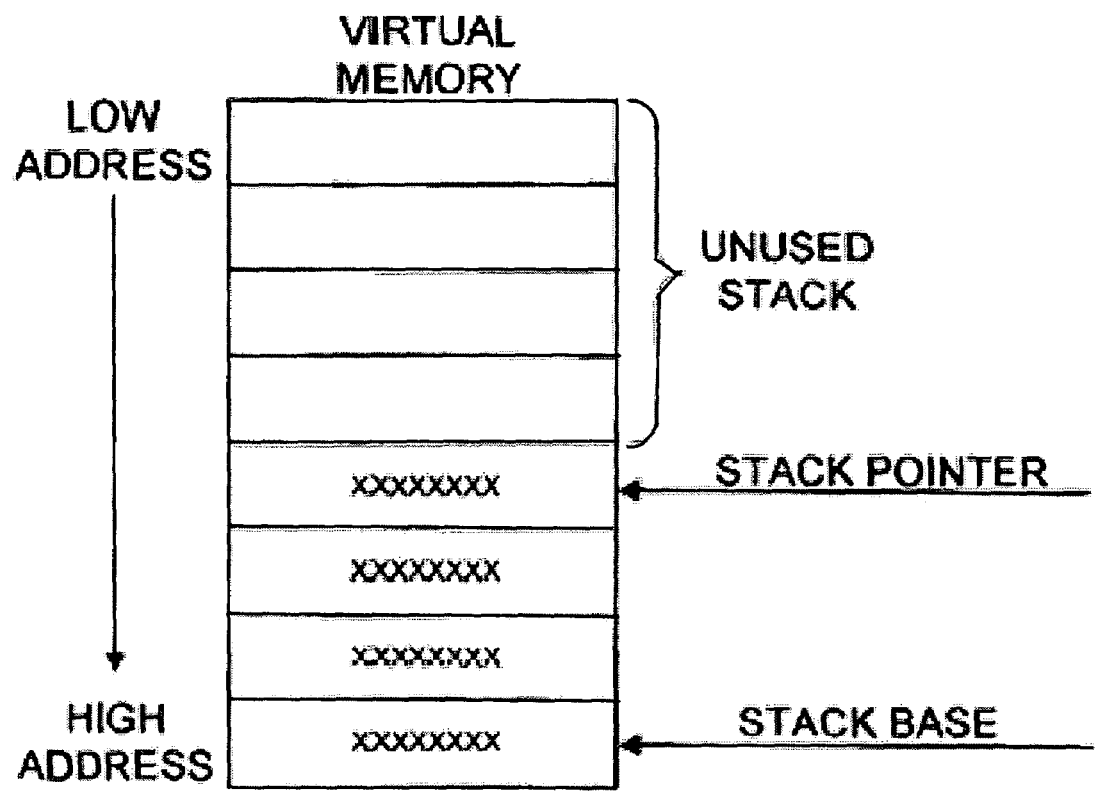
FIG. 2 shows a typical implementation of a memory stack.
Figure 3:
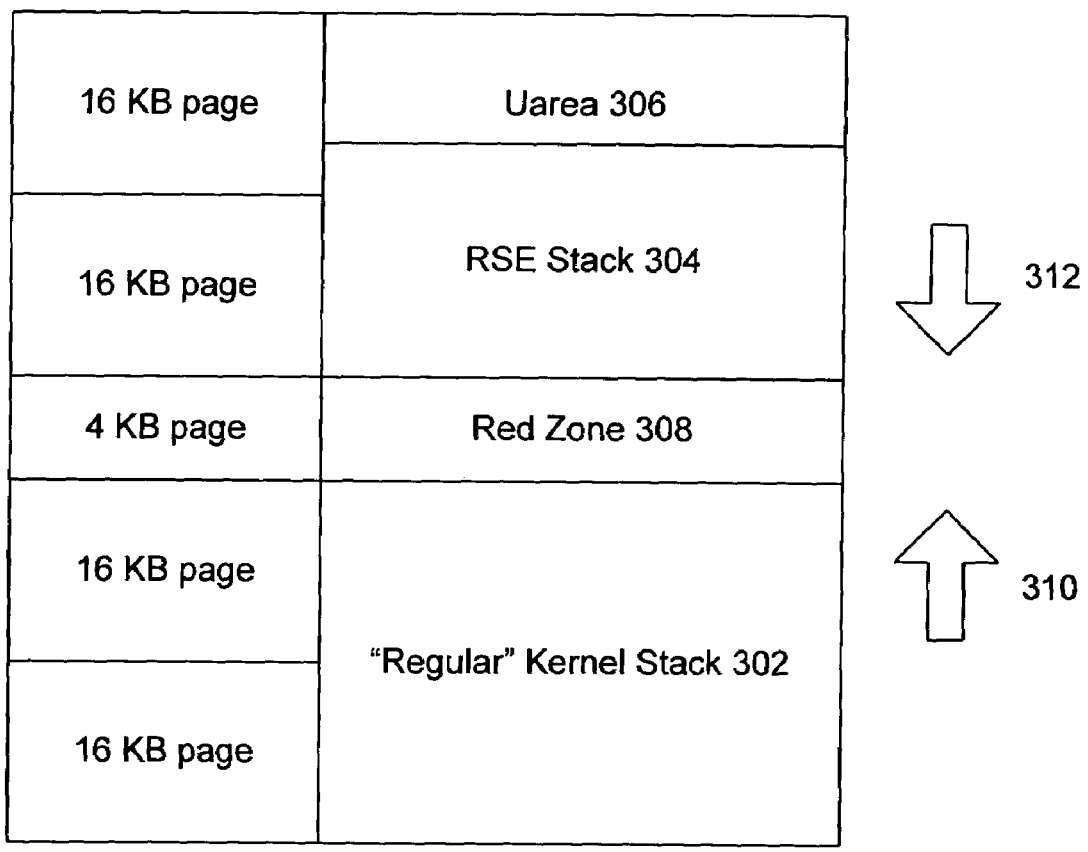
FIG. 3 is a conventional memory stack architecture of a process in an operating system configured for an IPF type processor.

FIG. 3 depicts a conventional memory stack architecture for the kernel of an operating system configured to execute on an IPF type processor. The memory stacks associated with the kernel include the "regular" kernel stack 302 and the RSE stack 304. In addition, there is a "uarea" 306 and a "red zone" 308.

The regular kernel stack 302 comprises the primary memory stack used by the kernel. The kernel stack 302 is mapped onto two sixteen kilobyte (16 KB) pages in memory.

The red zone 308 is a type of safety zone between the kernel stack 302 and the RSE stack 304. The red zone 308 comprises one 4 KB page that is located "above" (towards lower memory addresses) the kernel stack 302.

The RSE stack 304 is the memory stack used by the register stack engine. The RSE stack is sometimes called the backing store. The uarea 306 (sometimes called the "ublock") comprises a data structure that includes system information about a user process. The combined RSE stack 304 and uarea 306 region is mapped onto two 16 KB pages, with the uarea 306 located above the RSE stack 304. Two 16 KB pages are used for the combined region because the IPF architecture, as designed, does not currently support 32 KB pages.

In the conventional architecture, the kernel stack 302 is configured with its stack base on the high memory side such that it grows "upwards" 310 (towards low memory) in the direction of the red zone 308. The RSE stack 304 is oppositely configured with its stack base on the low memory side such that it grows "downwards" 312 (towards high memory) in the opposite direction but also in the direction of the red zone 308. This configuration allows a single red zone 308 to be used for both the kernel stack 302 and the RSE stack 304.

Figure 4:
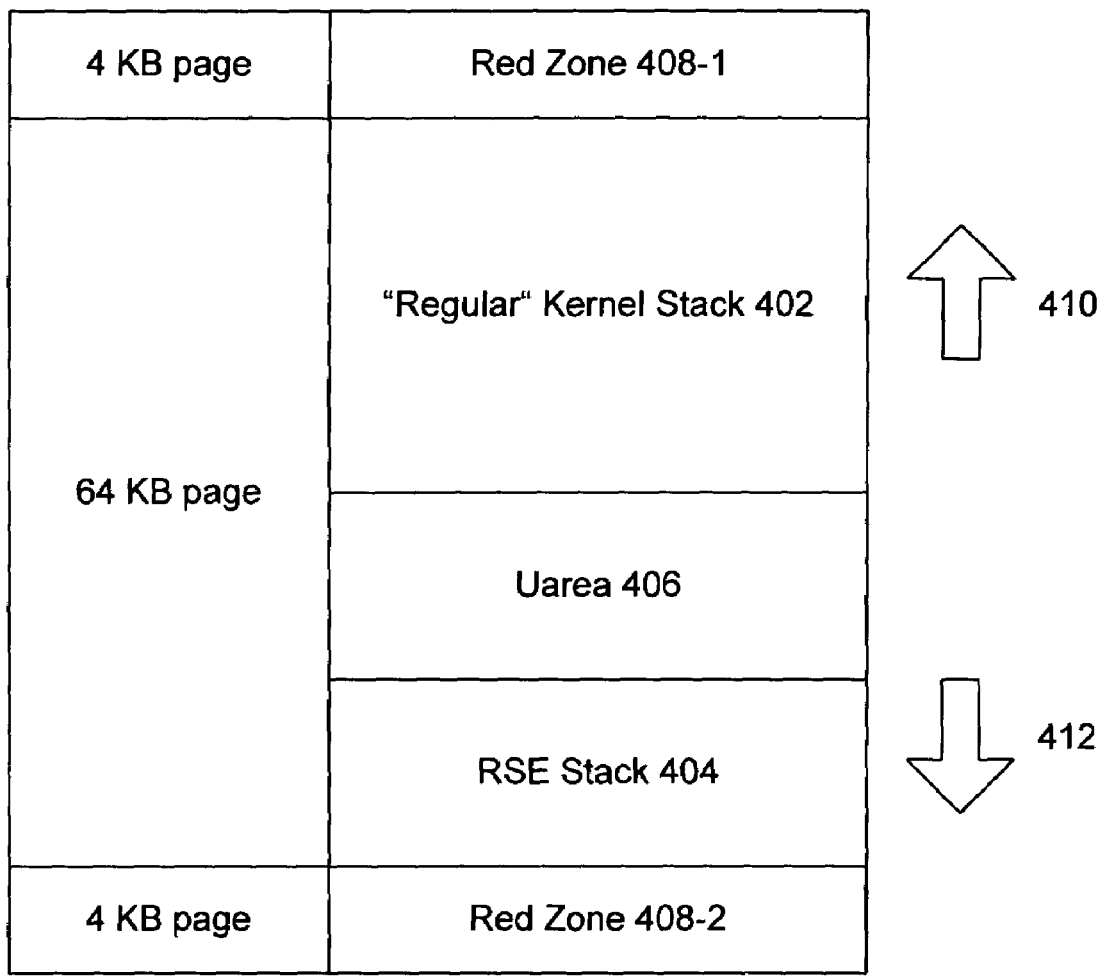
FIG. 4 is a memory stack architecture of a process in an operating system configured for an IPF type processor in accordance with an embodiment of the invention.

FIG. 4 depicts a memory stack architecture for the kernel of an operating system configured to execute on an IPF type processor in accordance with an embodiment of the invention. Like the conventional architecture, the illustrated memory stack architecture includes a "regular" kernel stack 402, an RSE stack (backing store) 404, and a "uarea" 406. Unlike the conventional architecture, the illustrated memory stack architecture includes two (not one) red zones 408-1 and 408-2. Moreover, the various components in the illustrated architecture are rearranged advantageously in comparison to the conventional arrangement.

The memory stack architecture of FIG. 4 comprises a single large 64 KB page to which the kernel stack 402, RSE stack 404 and uarea 406 are all mapped. The component are arranged within the single page as follows. The kernel stack 402 is mapped first (starting at low memory), followed by the uarea 406, and finally followed by the RSE stack 404. The use of a single 64 KB page to map the kernel stack 402, RSE stack 404 and uarea 406 contrasts with the conventional architecture which uses four 16 KB pages to map these components. This advantageously reduces the number of TLB misses that typically occur when a new process enters the kernel. The conventional architecture may have between two and four TLB misses for every kernel entry, while the architecture of FIG. 4 should have no more than one TLB miss for every kernel entry. Each TLB miss typically requires the time-consuming extra step of the microprocessor retrieving the necessary physical page number.

Another aspect of the memory stack architecture of FIG. 4 regards the directions of growth for the kernel stack 402 and the RSE stack 404. While the conventional architecture has these stacks growing towards each other (with a single red zone in between), the memory stack architecture of this embodiment of the invention has these stacks growing away from each other (and towards two separate red zones 408-1 and 408-2). This may be accomplished by growing the RSE stack 404 "downwards" towards higher memory addresses, and by growing the kernel stack 402 "upwards" towards lower memory addresses.

Growing the stacks away from each other advantageously avoids the need for a red zone "hole" in between the stacks. The red zone hole 308 in the conventional architecture prevents the use of a single large page for the kernel stack, RSE stack, and uarea. While two red zones are needed due to the stacks growing away from each other, applicants believe that this disadvantage is more than made up for by the advantage of the single large page.

Furthermore, growing the stacks away from each other advantageously facilitates implementation of dynamic growth of the kernel stack and/or the RSE stack over time. In one such implementation, when one of the stacks overflows into its corresponding red zone, then a fault is generated, and a stack overflow handler responds to the fault. The stack overflow handler is configured to allocate more memory to the overflowing stack and to re-position the corresponding red zone at the border of the newly enlarged stack.

In one embodiment of the invention, the memory system described above may be used in cooperation with a flavor of the UNIX operating system that is configured for a microprocessor with an Intel IPF processor architecture.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A memory system for a computer, the memory system comprising a single memory page including a kernel stack, a register stack engine (RSE) stack, and a data structure comprising system information about a user process, the kernel stack being separate and distinct from user program stacks in the memory system, wherein the kernel stack and the RSE stack are separated by said data structure, and wherein the kernel stack and the RSE stack are configured to grow apart in opposite directions away from said data structure.

2. The memory system of claim 1, further comprising:
a first red zone in a second memory page bordering a first memory region of the single memory page which is allocated to the kernel stack.

3. The memory system of claim 2, further comprising:
a second red zone in a third memory page bordering a second memory region of the single memory page which is allocated to the RSE stack.

4. The memory system of claim 1, wherein a number of translation lookaside buffer (TLB) misses when a process "enters" a kernel of an operating system of the computer is no more than one TLB miss.

5. The memory system of claim 1, wherein the memory system further comprises a stack overflow handler that is configured to allocate more memory to one of the stacks if it overflows.

6. The memory system of claim 1, wherein the memory system is used in cooperation with an operating system for the computer, and wherein the operating system comprises a flavor of UNIX.

7. The memory system of claim 1, wherein the memory system is used in cooperation with at least one microprocessor with an Itanium Processor Family processor architecture.

8. A computer system comprising:
a microprocessor including a register stack and a register stack engine (RSE);
an operating system including a kernel; and
a memory system configured to have a single memory page that includes a kernel stack, an RSE stack, and a data structure comprising system information about a user process, the kernel stack being separate and distinct from user program stacks in the memory system,
wherein the kernel stack and the RSE stack are separated by said data structure, and wherein the kernel stack and the RSE stack are configured to grow apart in opposite directions away from said data structure.

9. The computer system of claim 8, further comprising:
a first red zone in a second memory page bordering a first memory region of the single memory page which is allocated to the kernel stack.

10. The computer system of claim 9, further comprising:
a second red zone in a third memory page bordering a second memory region of the single memory page which is allocated to the RSE stack.

11. The computer system of claim 8, wherein a number of translation lookaside buffer (TLB) misses when a process "enters" a kernel of the operating system is no more than one TLB miss.

12. The computer system of claim 8, wherein the memory system further comprises a stack overflow handler that is configured to allocate more memory to one of the stacks if it overflows.

13. The computer system of claim 8, wherein the microprocessor is configured with an Itanium Processor Family processor architecture.

14. The computer system of claim 8, wherein the operating system comprises a flavor of UNIX.

15. A method of a process entering a kernel of an operating system configured for an Itanium Processor Family processor architecture, the method comprising:
accessing a kernel stack within a memory page;
accessing an RSE stack within the same memory page; and
accessing a data structure within the same memory page,
wherein the kernel stack is separate and distinct from user program stacks,
wherein said data structure comprises system information about a user process, and
wherein the kernel stack and the RSE stack are configured to grow apart in opposite directions away from said data structure.

* * * * *

UNITED STATES PATENT AND TRADEMARK OFFICE
CERTIFICATE OF CORRECTION

| | | |
|---|---|---|
| PATENT NO. | : 7,100,014 B2 | Page 1 of 1 |
| APPLICATION NO. | : 10/662734 | |
| DATED | : August 29, 2006 | |
| INVENTOR(S) | : Christopher Philip Ruemmler et al. | |

It is certified that error appears in the above-identified patent and that said Letters Patent is hereby corrected as shown below:

On the title page, item (73), in "Assignee", in column 1, line 2, delete "LP.," and insert -- L.P., --, therefor.

Signed and Sealed this

Twenty-eighth Day of July, 2009

JOHN DOLL
*Acting Director of the United States Patent and Trademark Office*